United States Patent
Chou et al.

(10) Patent No.: US 7,538,465 B2
(45) Date of Patent: May 26, 2009

(54) FAN ASSEMBLY AND ITS HOUSING

(75) Inventors: Yi-Fang Chou, Taoyuan Hsien (TW);
Tsu-Liang Lin, Taoyuan Hsien (TW);
Kuo-Cheng Lin, Taoyuan Hsien (TW);
Wen-Shi Huang, Taoyuan Hsien (TW)

(73) Assignee: Delta Electronics, Inc., Taoyuan Sien (TW)

( * ) Notice: Subject to any disclaimer, the term of this patent is extended or adjusted under 35 U.S.C. 154(b) by 7 days.

(21) Appl. No.: 10/779,674

(22) Filed: Feb. 18, 2004

(65) Prior Publication Data

US 2005/0023914 A1 Feb. 3, 2005

(30) Foreign Application Priority Data

Jul. 28, 2003 (TW) ............... 92213696 U (51) Int. Cl.
*H02K 5/00* (2006.01)

(52) U.S. Cl. ...................... 310/91; 310/67 R (58) Field of Classification Search .................. 310/91, 310/67 R; 439/607
See application file for complete search history.

(56) References Cited

U.S. PATENT DOCUMENTS

| | | | | |
|---|---|---|---|---|
| 3,969,011 A | * | 7/1976 | Yamada | 439/569 |
| 4,099,274 A | * | 7/1978 | Emberson | 4/286 |
| 4,936,726 A | * | 6/1990 | Medard | 411/44 |
| 4,959,571 A | * | 9/1990 | Yasumoto et al. | 310/67 R |
| 5,045,740 A | * | 9/1991 | Hishinuma | 310/156.45 |
| 5,125,853 A | * | 6/1992 | Hashiguchi | 439/607 |
| 5,245,236 A | * | 9/1993 | Horng | 310/67 R |
| 5,419,713 A | * | 5/1995 | Northey | 439/567 |
| 5,997,265 A | * | 12/1999 | Chung | 417/423.13 |
| 6,135,788 A | * | 10/2000 | Wang et al. | 439/79 |
| 6,293,823 B1 | * | 9/2001 | Kasuga | 439/573 |
| 6,652,360 B2 | * | 11/2003 | Cutsforth | 451/29 |
| 6,935,895 B2 | * | 8/2005 | Fan | 439/607 |

FOREIGN PATENT DOCUMENTS

| | | | |
|---|---|---|---|
| DE | 3809627 A | * | 10/1989 |
| JP | 08205450 A | * | 8/1996 |
| TW | 509458 Y | | 11/2002 |

* cited by examiner

*Primary Examiner*—Nguyen N Hanh
(74) *Attorney, Agent, or Firm*—Birch, Stewart, Kolasch & Birch, LLP (57) ABSTRACT

A fan housing. The fan housing mounted on a frame of a system includes a main body, a first section, a second section and a fixing portion. Both the first and second sections are disposed on the main body. A gap is formed between the first and second sections. The fixing portion is formed in the gap.

8 Claims, 8 Drawing Sheets

FAN ASSEMBLY AND ITS HOUSING

This Non-provisional application claims priority under 35 U.S.C. 119(a) on Patent Application No. 092213696 filed in TAIWAN on Jul. 28, 2003, the entire contents of which are hereby incorporated by reference.

BACKGROUND OF THE INVENTION

1. Field of the Invention

The present invention relates in general to a fan housing and in particular to a housing of a fan assembly that can be easily and securely mounted on a system frame.

2. Description of the Related Art

Figure 1:
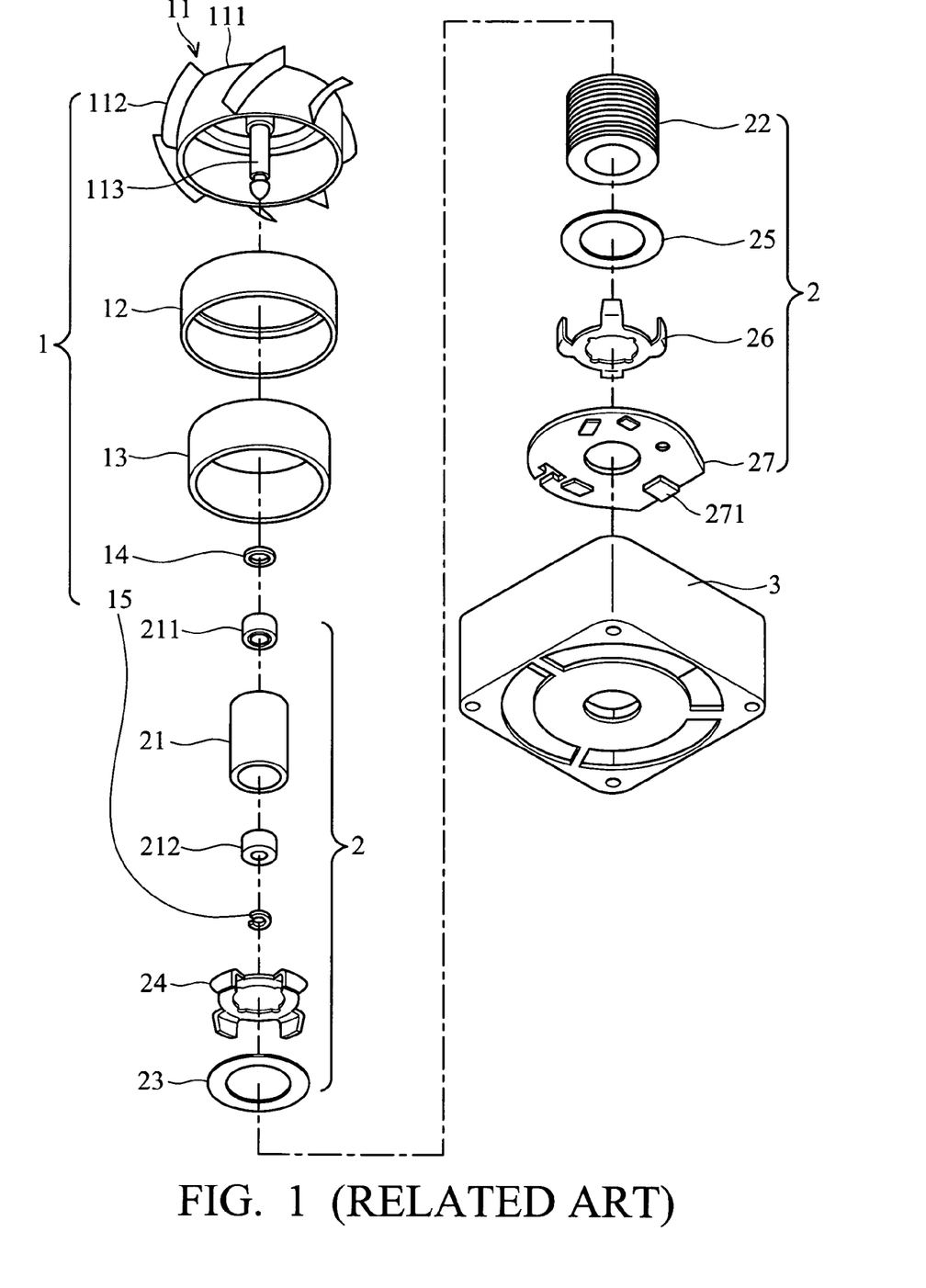
FIG. 1 is a schematic diagram of a conventional fan.

A conventional fan is shown in FIG. 1, including a rotor assembly 1, a stator 2 and a frame 3. The rotor assembly 1 includes a blade structure 11 having a hub 111 and blades 112 disposed around the periphery of the hub 111. A metal shield 12 and a magnet 13 are disposed in the hub 111 accordingly. A shaft 113 is placed in the center of the hub 111 and a washer 14 is placed on the shaft 113. The stator 2 includes a sleeve 21, a coil 22, an upper insulation spacer 23, an upper pole plate 24, a lower insulation spacer 25, a lower pole plate 26 and a circuit board 27. The sleeve 21 is a hollow tube and a ball bearing 211 is disposed in the upper interior portion of the sleeve 21. The lower portion of the sleeve 21 has a self-lubricating bearing 212. Several bushings are placed between the ball bearing 211 and the self-lubricating bearing 212. The upper insulation spacer 23 and the upper pole plate 24 are placed sequentially on top of coil 22, and encircle the outer periphery of the sleeve 21. Next, the lower insulation spacer 25, the lower pole plate 26 and the circuit board 27 are placed sequentially and encircle the outer periphery of sleeve 21. Thus, the top surface of the lower insulation spacer 25 contacts the lower end of coil 22. The shaft 113 of the rotor assembly 1 passes through the opening in ball bearing 211 and the self-lubricating bearing 212 and a ring is locked at the end of the shaft 113 to connect the rotor assembly 1 and the stator 2. Further, a sensor is disposed on the circuit board 27 for detecting and controlling the magnetic field of the stator 2. Finally, the bottom surface of the stator 2 is connected to the frame 3 thereby completing the fan assembly.

Figure 2A:
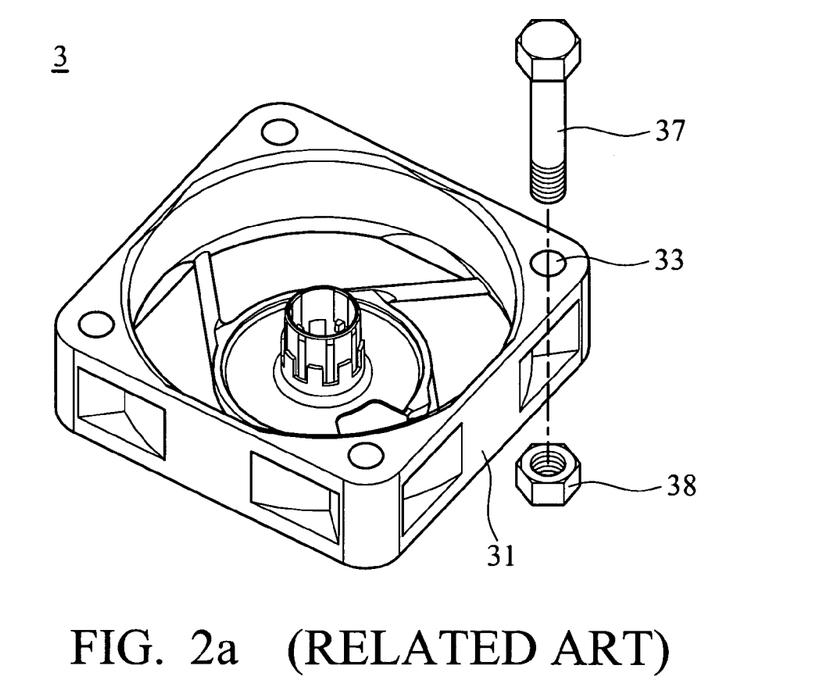
FIG. 2a is a schematic diagram of an outer frame of a conventional fan.
Figure 2B:
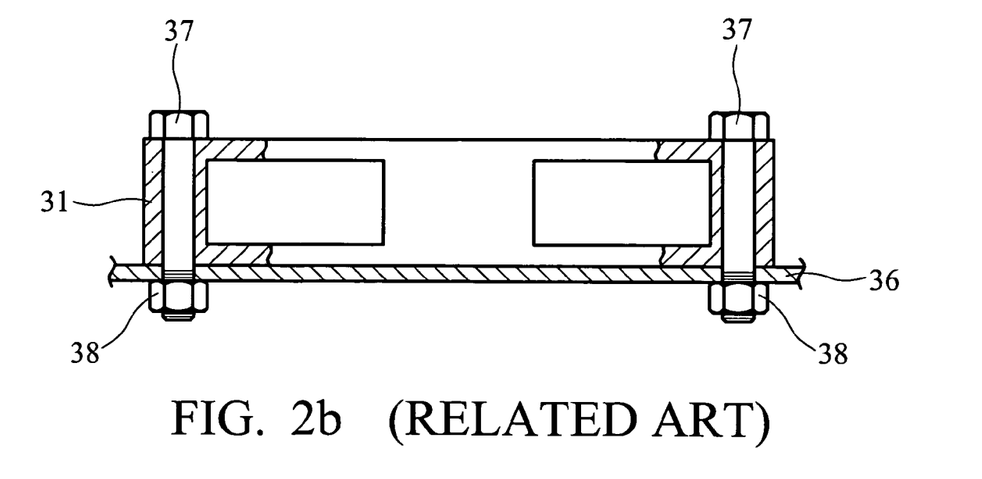
FIG. 2b is a schematic diagram of the outer frame of FIG. 2a in use.

In practice, the fan is fixed in a system, such as a computer, through the frame 3. Referring to FIG. 2a, a conventional frame 3 has a main body 31 and through holes 33 formed at each corner of the frame 3. Referring to FIG. 2b, the fan is fixed onto the system frame 36 by a screw 37 passing through the through hole 33 and a hole disposed on the system frame 36 to engage with a nut 38. However, such a frame 3 is so thick that the screw 37 must be longer enough to pass therethrough to complete the assembly. Further, as shown in FIG. 2b, the end of the screw 37 protrudes out of the system frame 36, which will easily hurt the assemblers or users. Additionally, when assembling, the fan must be held to fasten the nut 38 for fixing the fan to the system frame 36; accordingly, a large assembly area is required.

Figure 3A:
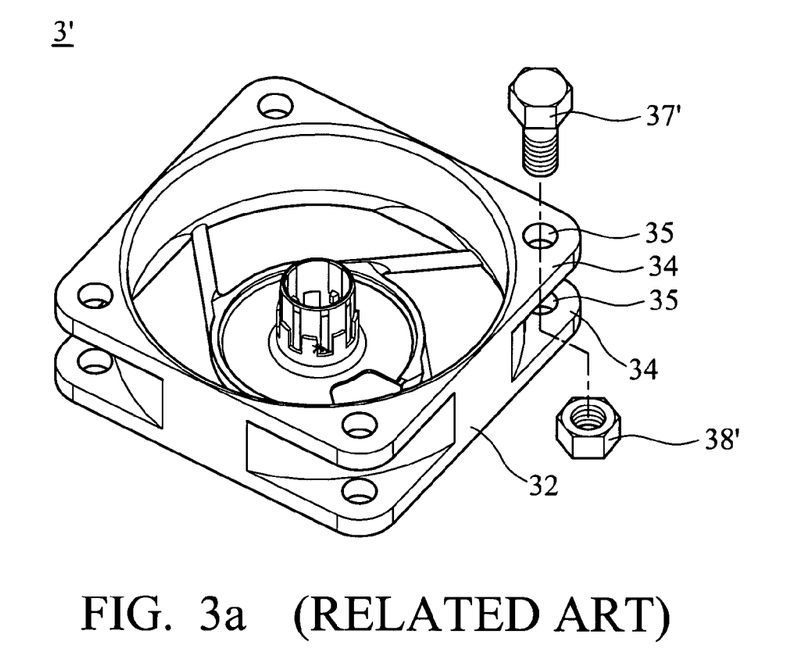
FIG. 3a is a schematic diagram of an outer frame of another conventional fan.
Figure 3B:
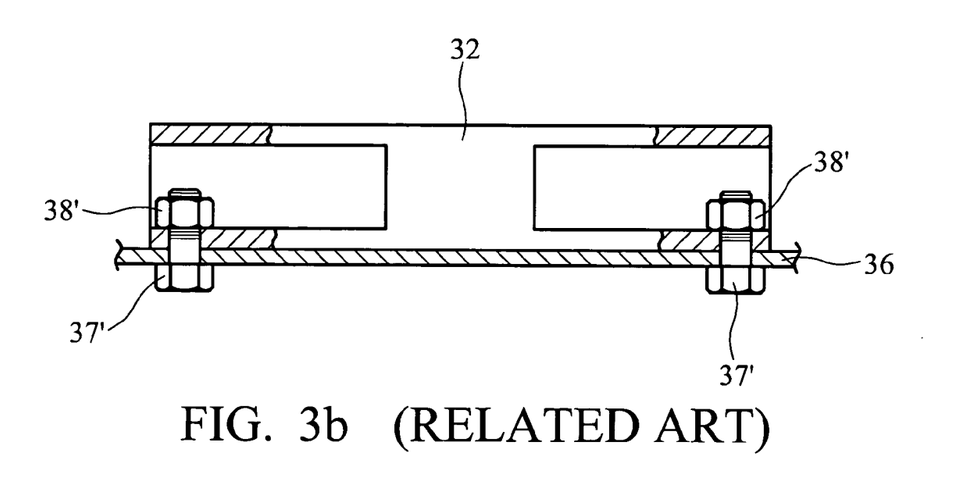
FIG. 3b is a schematic diagram of the outer frame of FIG. 3a in use.

Another conventional frame 3' is shown in FIG. 3a. The frame 3' has a main body 32 and flanges 34 formed at each corner of the frame 3'. An opening 35 is formed on each flange 34. Referring to FIG. 3b, the fan is connected to a system frame 36 in a system (such as a computer) by a screw 37' passing through a hole formed on the system frame 36, the opening 35, and a nut 38'. The flanges 34, however, are not completely supported, and the screw 37' only passes through the opening 35 on one side of the frame 3' for clipping the flange 34 of the frame 3', such that the assembling strength is obviously insufficient. Likewise, the fan must be held to fasten the nut 38', for fixing the fan to the system frame 36; accordingly, ir is relatively inconvenient and a larger assembly area is required.

SUMMARY OF THE INVENTION

Therefore, an object of the present invention is to disclose a fan housing that solves the above mentioned problem.

The fan housing of the present invention includes a main body, a first section, a second section and a fixing portion. The first section is disposed on the main body. The second section is disposed on the main body. A gap is formed between the first and second sections and the fixing portion formed therein. A fastening structure partially engages with the gap for mounting the fan housing on the system frame. The fixing portion prevents the fastening structure from rotating and limits the position of the fastening structure.

The first section may have a through hole, and the fastening structure may include a screw and a nut disposed in the gap. The nut is in aligned with the through hole by the fixing portion. The screw passes through the through hole, engaging with the nut. The second section prevents the nut from moving along an axial direction of the screw.

The second section may have a recess aligned with the through hole of the first section, and the screw can be further accommodated by the recess.

The profile of the fastening structure corresponds to the profile of the gap.

The main body may be rectangular, and the first and second sections and the fastening structure are disposed at corners of the main body.

The fastening structure may comprise a hook connected to the gap for mounting the fan housing on the system frame.

The first section has a through hole, and the hook passes through the through hole, connecting to the gap.

The main body and the first and second sections are an integral structure formed by injection molding.

The fan housing may further comprise a base at a bottom of the main body, wherein a plurality of ribs or stator blades are disposed between the base and the main body for guiding an air flow.

The stator blades have the same inclined angle.

Further, the present invention discloses a fan assembly mounted on a frame of a system. The fan assembly includes a rotor and a fan housing. The fan housing has a base to receive the rotor. The fan housing includes a main body, a first section, a second section and a fixing portion. The first section is disposed on the main body. The second section is disposed on the main body. A gap is formed between the first and second sections and the fixing portion formed therein. A fastening structure partially disposed in the gap for mounting the fan housing on the frame in the system. The fixing portion prevents the fastening structure from rotating and limits the position of the fastening structure.

The base at a bottom of the main body can support the rotor, a plurality of ribs or stator blades are disposed between the base and the main body for guiding an air flow.

The stator blades have the same inclined angle and shape similar to those of rotor blades of the rotor.

The fan assembly may further include a stator disposed in the base, and the stator has at least one coil.

The rotor mentioned above may include a magnet coupled to the stator. The rotor may further include a metal shell coupled to the magnet. The rotor may further include a hub coupled to the metal shell.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

Figure 4:
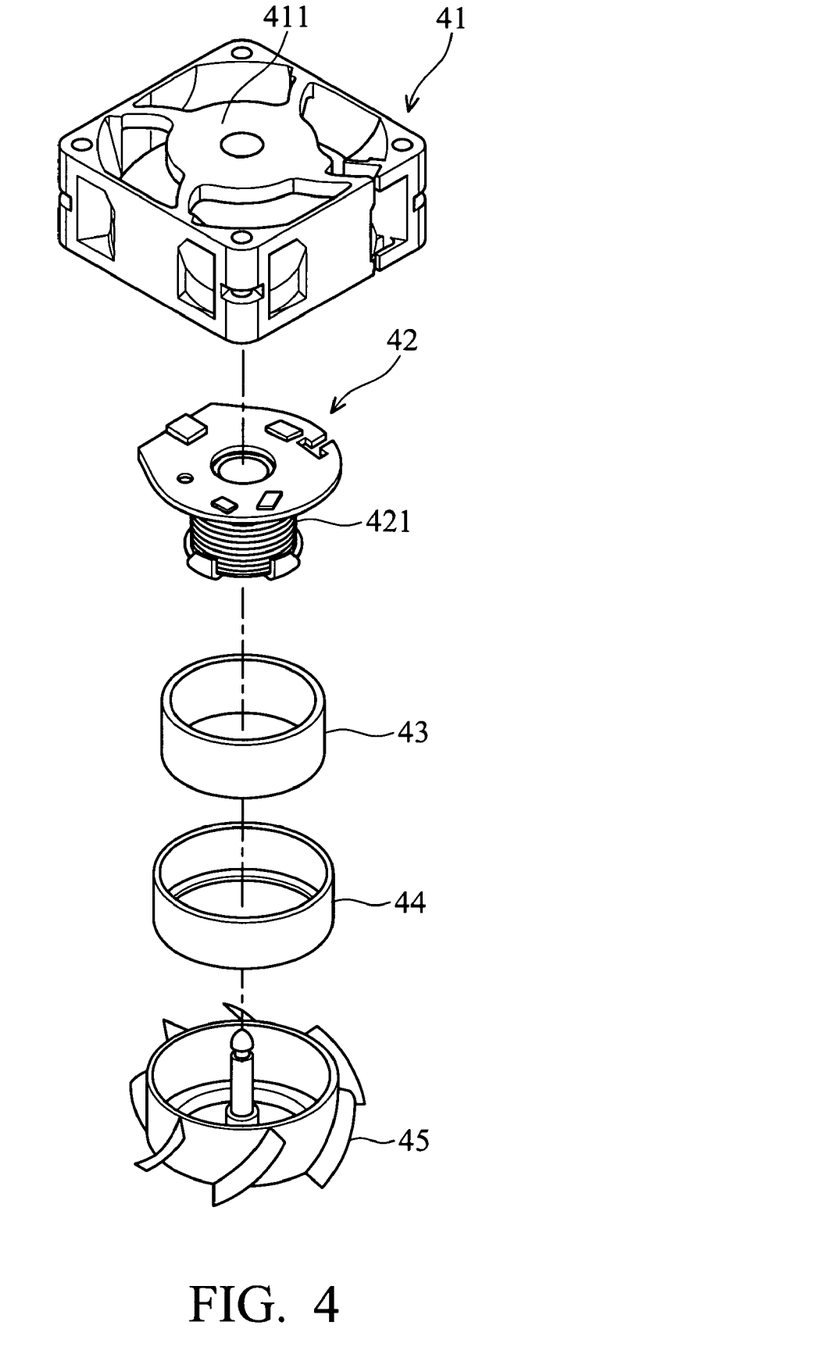
FIG. 4 is a schematic diagram of a fan assembly in accordance with the present invention.

Referring to FIG. 4, a fan assembly includes a fan housing 41, a stator 42, a magnet 43, a metal shell 44 and a hub 45. The fan housing 41 has a base 411, and the stator 42 has a coil 421. The fan housing 41, the stator 42, the magnet 43, the metal shell 44 and the hub 45 are sequentially connected. The stator 42 is mounted on the base 411 of the fan housing 41.

Figure 5A:
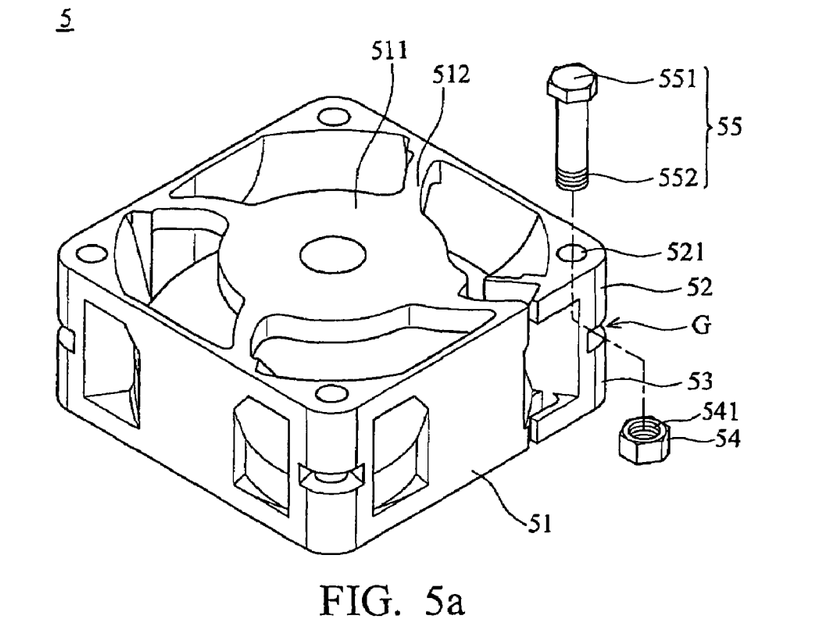
FIG. 5a is a schematic diagram of a first embodiment of a an housing in accordance with the present invention.
Figure 5B:
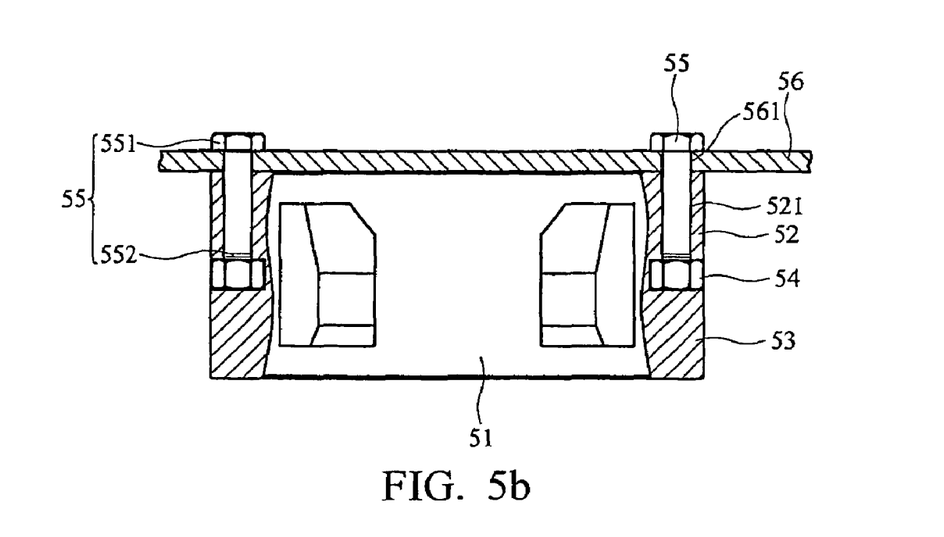
FIG. 5b is a schematic diagram of the housing of FIG. 5a in use.

FIGS. 5a and 5b show a first embodiment or a fan housing in a fan assembly of the present invention. The fan housing S includes a main body 51, a first section 52, a second section 53, a fastening structure 54 and a screw 55, wherein the screw 55 has two ends 551, 552. Both the first and second sections 52 and 53 are disposed on the main body 51. The first section 52 lies a through hole 521. The fastening structure 54, with a profile corresponding to or substantially equal to that of the gap G, has a threaded hole. In addition, the fan housing 5 further includes a base 511 for supporting the stator and rotor, and a plurality of ribs or stator blades 55 disposed between the base 511 and the main body 51. The stator blades 55 have shape similar to those of rotor blades 55 6f the rotor, and have the same inclined angle.

In FIG. 5b, a gap G is formed between the fist section 52 and the second section 53. The fastening structure 54 is placed in the gap G. When the fan assembly is fixed onto a system frame 56, the screw 55 passes through the hole 561 in the system frame 56 and then passes through the through hole 521 of the first section 51, and finally engages with the threaded hole 541 of the fastening structure 54. The second section 53 prevents the fastening structure 54 from moving along an axial direction of the screw 55, and prevents one end 552 of the screw 55 from being exposed.

Figure 6:
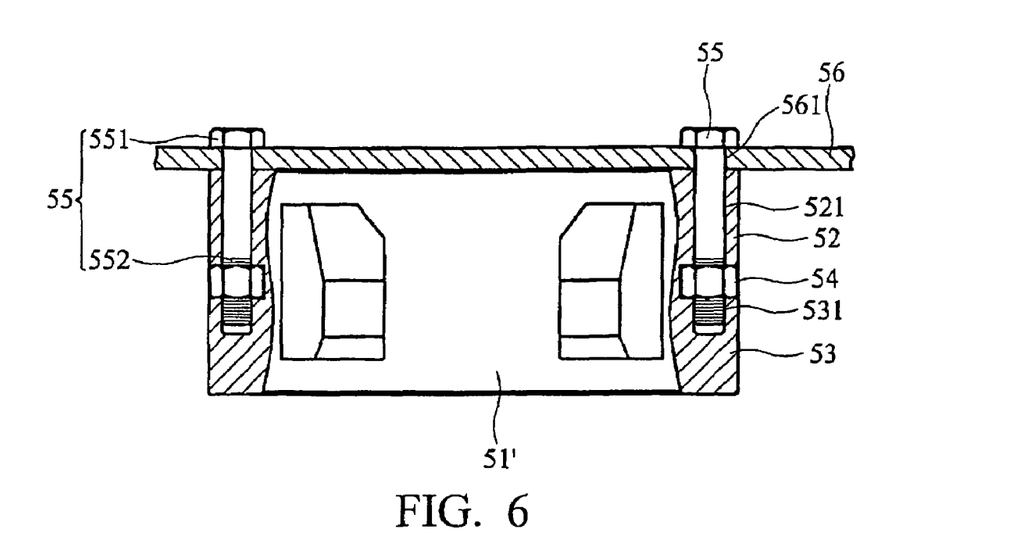
FIG. 6 is a schematic diagram of a second embodiment of the fan housing in use in accordance with the present invention.

FIG. 6 shows a second embodiment of a fan housing in a fan assembly of the present invention. The different between the first and second embodiments is that the second section 53 of a main body 51' has a recess 531 aligned with the through hole 521 of the first section 52 in the second embodiment. Therefore, when assembling as mentioned above, the screw 55 can be further accommodated by the recess 531 to increase connection strength.

Due to the correspondence of the fastening structure 54 and the gap G, the fastening structure 54 is prevented from rotating or sliding in the gap G. Therefore, the fan assembly can be fixed onto the system frame 56 by simple alignment of the hole 561 to the through hole 521 without requiring that the fastening structure 54 must be held. The fan housing 5 is then easily fixed onto the system frame 56. Moreover, in this embodiment, the fastening structure 54 may be a nut, and may further be a hexagonal nut.

Figure 7:
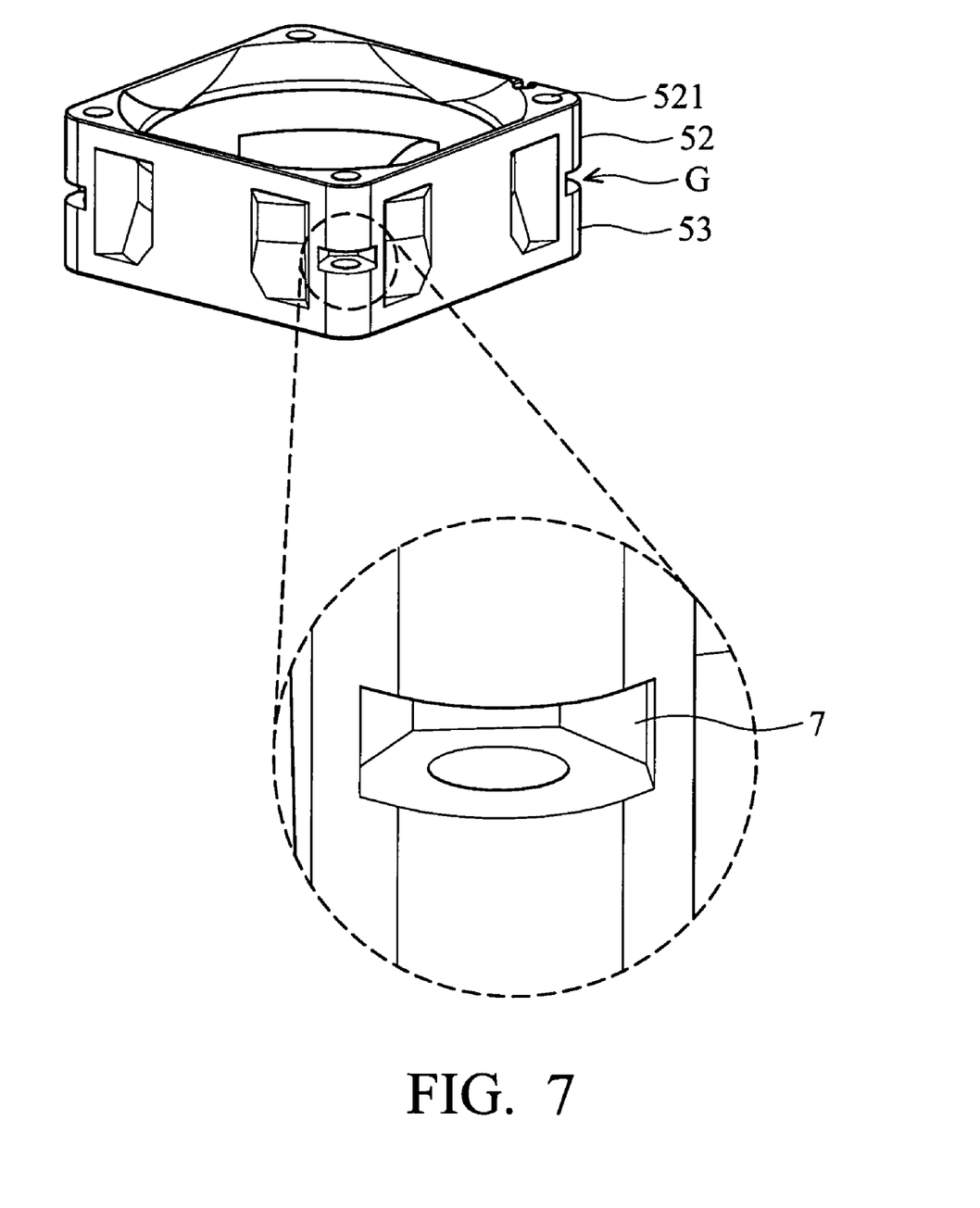
FIG. 7 is a partially enlarged view of the gap G in accordance with the present invention.

FIG. 7 shows an enlarged view of the gap G of the present invention. A fixing portion 7 is formed in the gap G so that the fastening structure can be fixed therein, preventing rotation. An integral structure including the fixing portion, the main body 51, the first section 52, the second section 53 and the gap G is formed by injection molding. The profile of the fixing portion 7 corresponds to the profile of the fastening structure 54 for preventing rotation in the gap G and limiting the position thereof. For example, the fastening structure 54 aligns with the through hole 521 by the fixing portion 7 so that the screw 55 can easily pass through the through hole 521 and engage with the fastening structure 54.

Figure 8A:
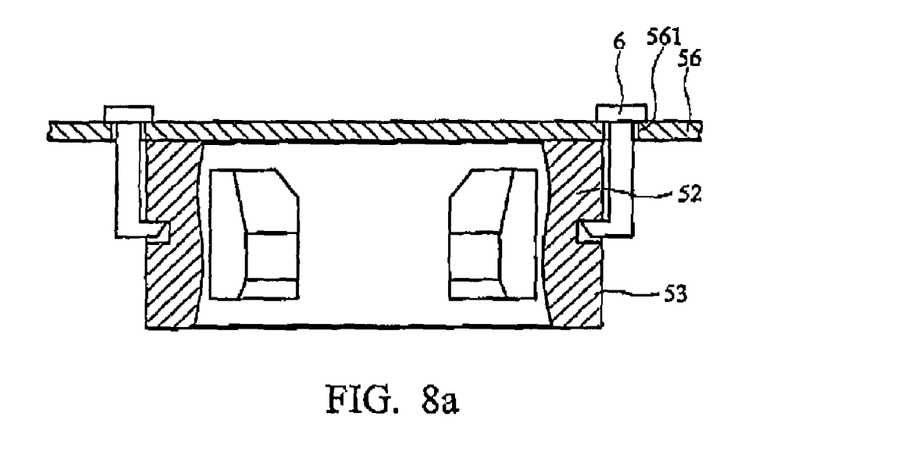
FIG. 8a is a schematic diagram of an exemplary embodiment of the fan housing in use in accordance with the present invention.
Figure 8B:
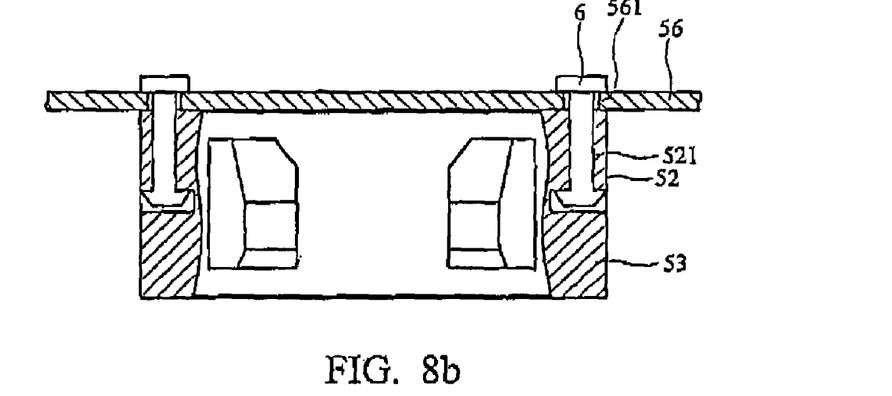
FIG. 8b is a schematic diagram of an exemplary embodiment of the fan housing in use in accordance with the present invention.

Moreover, the fastening structure can be a hook, with a profile corresponding to or substantially equal to that of the gap G. For example, as shown in FIG. 8a, the hook 6 passes through the hole 561 on the system frame 56 and then joins the gap G from outside of the fan housing. Alternatively, as shown in. FIG. 8b, the hook 6 passes through the hole 561 on the system frame 56 and the through hole 521 of the first section 52 accordingly, and then connects the gap G. The two methods mentioned above achieve the same result of fixing the fan assembly to the system frame 56.

In the first and second embodiments, the main body of the fan housing can be rectangular, and the first and second sections and the fastening structure are disposed at each corner of the fan housing. Further, an integral structure including the main body and the first and second sections are formed by injection molding.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fan housing mounted on a frame of a system, comprising:

a main body having;

a first section of the main body having a through hole;

a second section disposed on the main body, and having a recess aligned with the through hole;

a fixing portion formed in a gap formed between the first and second sections; and a fastening structure passing through the first section via the through hole, and having one end accommodated by the recess and a part disposed in the gap and having a profile corresponding to that of the gap;

wherein the recess of the second section prevents the one end of the fastening structure from being exposed.

2. The fan housing as claimed in claim 1, wherein the fixing portion prevents the fastening structure from rotating and limits the position of the fastening structure.

3. The fan housing as claimed in claim 2, wherein the fastening structure includes a screw and the part is a nut disposed in the gap and having the profile substantially identical to that of the gap, the nut is in aligned with the through hole by the fixing portion, the screw passes through the through hole and engages with the nut and the first and second sections prevent the nut from moving along an axial direction of the screw.

4. The fan housing as claimed in claim 1, wherein the main body is rectangular, and the first and second sections, the fixing portion and the fastening structure are disposed at corners of the main body.

5. The fan housing as claimed in claim 1, wherein the part is a hook passing through the through hole and connected to the gap for mounting the fan housing on the frame in the system.

6. The fan housing as claimed in claim 1, wherein the main body, the first and second sections and the fixing portion are a monolithic piece formed by injection molding.

7. The fan housing as claimed in claim 1, further comprising a base at a bottom of the main body, wherein a plurality of ribs or stator blades are disposed between the base and the main body for guiding an air flow.

8. The fan housing as claimed in claim 7, wherein the ribs or stator blades have the same inclined angle.

* * * * *